US008054883B2

(12) United States Patent
Filippini et al.

(10) Patent No.: US 8,054,883 B2
(45) Date of Patent: Nov. 8, 2011

(54) METHOD FOR TRANSCODING COMPRESSED VIDEO SIGNALS, RELATED APPARATUS AND COMPUTER PROGRAM PRODUCT THEREFOR

(75) Inventors: Gianluca Filippini, Lodi (IT); Emiliano Mario Angelo Piccinelli, Cavenago di Brianza (IT); Fabrizio Simone Rovati, Cinisello Balsamo (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 1848 days.

(21) Appl. No.: 11/206,644

(22) Filed: Aug. 17, 2005

(65) Prior Publication Data

US 2006/0039473 A1   Feb. 23, 2006

(30) Foreign Application Priority Data

Aug. 18, 2004  (EP) .................................. 04019572

(51) Int. Cl.
*H04N 7/12* (2006.01)
*H04N 11/02* (2006.01)
*H04N 11/04* (2006.01)
*H04B 1/66* (2006.01)

(52) U.S. Cl. ................................. 375/240.16
(58) Field of Classification Search .................. None
See application file for complete search history.

(56) References Cited

U.S. PATENT DOCUMENTS

| | | | | |
|---|---|---|---|---|
| 5,473,380 A * | 12/1995 | Tahara | ...... | 375/240.23 |
| 5,715,009 A * | 2/1998 | Tahara et al. | ...... | 375/240.23 |
| 5,812,194 A * | 9/1998 | Wilkinson | ...... | 375/240.15 |
| 5,907,374 A * | 5/1999 | Liu | ...... | 375/240.26 |
| 6,526,099 B1 | 2/2003 | Christopoulos et al. | . | 375/240.26 |
| 6,577,679 B1 * | 6/2003 | Apostolopoulos | ...... | 375/240.12 |
| 7,444,418 B2 * | 10/2008 | Chou et al. | ...... | 709/231 |
| 7,574,060 B2 * | 8/2009 | Gambhire | ...... | 382/233 |
| 7,869,501 B2 * | 1/2011 | Park et al. | ...... | 375/240.01 |
| 2005/0058198 A1 * | 3/2005 | Zhao et al. | ...... | 375/240.03 |

OTHER PUBLICATIONS

Bortot, L., et al., "An Innovative Low Complexity MPEG-2 Video Transcoder Operating in the DCT Domain", IEEE—International Conference on Consumer Electronics, Los Angeles, USA, Jun. 2000, pp. 312-313.
Kalva, H., "Issues in H.264/MPEG-2 Video Transcoding," Feb. 20, 2004, URL: http://www.cse.fau.edu/{hari/papers/kalva_ccnc2004.pdf>, 5 pages.
Keesman, G., et al., "Transcoding of MPEG Bitstreams," *Signal Processing: Image Communication* 8:481-500, 1996.
Wee, S., et al., "Compressed-Domain Video Processing," Oct. 6, 2002, URL: http://www.hpl.hp.com/techreports/2002, 35 pages.
Xin, J., et al., "Converting DCT Coefficients to H.264/AVC Transform Coefficients," Jun. 2004, URL: http://www.merl.com/reports/docs/TR2004-058.pdf, 8 pages.

* cited by examiner

*Primary Examiner* — Nhon Diep
(74) *Attorney, Agent, or Firm* — Lisa K. Jorgenson; Timothy L. Boller; Seed IP Law Group PLLC

(57) ABSTRACT

Transcoder apparatus for transcoding an input video bit-stream having a first encoding profile (e.g., MPEG-2) into an output video bit-stream having a second encoding profile (e.g., H.264), the first encoding profile including motion estimation information, the apparatus including: a front-end for extracting the motion estimation information from the input video bit-stream, and a back-end for constructing the output bit-stream. The front-end and the back-end of the apparatus are interconnected (e.g., via a buffer) to pass the motion estimation information from the front-end to the back-end, thereby avoiding motion estimation in constructing the output bit-stream at the apparatus back-end.

40 Claims, 7 Drawing Sheets

US 8,054,883 B2

METHOD FOR TRANSCODING COMPRESSED VIDEO SIGNALS, RELATED APPARATUS AND COMPUTER PROGRAM PRODUCT THEREFOR

BACKGROUND OF THE INVENTION

1. Field of the Invention

This disclosure relates to techniques for transcoding compressed video signals, including application in transcoding an MPEG-2 Main Profile bit-stream into an H.264 Main Profile bit-stream.

Reference to this possible application is not however to be construed in a limiting sense of the scope of the invention.

2. Description of the Related Art

The video coding scheme known as MPEG-2, developed ten years ago, is the current standard for digital video transmission at mid/high bit-rates.

Since 1995, after the finalization of MPEG-4 and H.263, the evolution of digital video communication and compression techniques has led to the introduction of the new H.264 standard (also known as Advanced Video Coding (AVC), or MPEG-4 part 10). In comparison with MPEG-2 and MPEG4, H.264 has a wider application spectrum, ranging from broadcast High Definition Television (HDTV) transmission, to High Definition Digital Versatile Disc (HD DVD), mobile phone and video streaming. In fact, H.264 delivers much higher compression at the same image quality of MPEG-2 and H.263

Nowadays, thanks to digital TV and DVD, the MPEG-2 format is widely used for broadcast and consumer application. MPEG-2 coded material is already extensively present in many homes, in the form of DVD movies or personal videos from portable digital cameras. New video storage and diffusion scenarios are now present, with different requirements in terms of high definition TV (broadcast) and video streaming on small networks (home). The new H.264 codec is quite likely to be the choice for the coming years for all these new applications, thanks to its basic ability in compressing video sequences much more effectively than "old" standards.

In view of the foregoing, all of the MPEG-2 material previously created, broadcast or stored has to be taken into account in this new scenario. Specifically, the need is felt of compatibility with the new standard for carriers still the using MPEG-2 standard by permitting e.g., MPEG-2 to H.264 transcoding.

BRIEF SUMMARY OF THE INVENTION

An embodiment of the invention provides a satisfactory response to the needs outlined in the foregoing, by providing i.a. an efficient method for transcoding an MPEG-2 Main Profile bit-stream into an H.264 Main Profile bit-stream.

According to some embodiments, a method has the features set forth in the claims that follow, such claims being in all respect an integral part of the present disclosure. Other embodiments relate to a corresponding system as well as a related computer program product, loadable in the memory of at least one computer and including software code portions for performing the steps of the method of the invention when the product is run on a computer. As used herein, reference to such a computer program product is intended to be equivalent to reference to a computer-readable medium containing instructions for controlling a computer system to coordinate the performance of the method of the invention. Reference to "at least one computer" is evidently intended to highlight the possibility for an embodiment to be implemented in a distributed/modular fashion.

An embodiment of the invention is thus a method of transcoding an input video bit-stream having a first encoding profile into an output video bit-stream having a second encoding profile, the first encoding profile including motion estimation information. The embodiment includes the operations of:

extracting the motion estimation information from the input video bit-stream, and passing the motion estimation information extracted from the input video bit-stream on to the output video bit-stream, thereby avoiding motion estimation in constructing the output bit-stream.

In one embodiment, the first encoding profile has associated motion vectors that are extracted from the input video bit-stream and passed on to the output video bit-stream.

In one embodiment, the first encoding profile has associated quantization factors that are extracted from the input video bit-stream and passed on to the output video bit-stream.

In one embodiment, the first encoding profile has at least one associated coding mode that is extracted from the input video bit-stream and passed on to the output video bit-stream. The at least one coding mode may be selected for the group consisting of: intra or predicted coding, Group Of Pictures (GOP), frame type, frame size, and frame rate.

One embodiment of the invention includes the operation of performing full decoding of the input bit-stream, which may be performed by decoding the input bit-stream down to the decoded pixels level.

In one embodiment, a method of transcoding an input video bit-stream having a first encoding profile into an output video bit-stream having a second encoding profile, said first encoding profile including motion estimation information, comprising the steps of: extracting said motion estimation information from said input video bit-stream; and passing said motion estimation information on for use in constructing said output video bit-stream, thereby avoiding motion estimation in constructing said output bit-stream. In one embodiment, the first encoding profile has associated motion vectors and the method further comprises the steps of: extracting said motion vectors from said input video bit-stream; and passing said motion vectors on for use in constructing said output video bit-stream.

In one embodiment, the method further comprises a motion vector refinement step. In one embodiment the motion vector refinement step comprises generating a motion vector in said second encoding profile starting from a motion vector having a coarser pixel resolution in said first encoding profile. In one embodiment, the motion vector refinement step comprises using a smaller motion compensation partition in said second encoding profile than in said first encoding profile.

In one embodiment, the first encoding profile has associated quantization factors and the method further comprises the steps of: extracting said quantization factors from said input video bit-stream; and passing said quantization factors on for use in constructing said output video bit-stream.

In one embodiment the first encoding profile has at least one associated coding mode and the method further comprises the steps of: extracting said at least one coding mode from said input video bit-stream; and passing said at least one coding mode on for use in constructing said output video bit-stream. In one embodiment the at least one coding mode is selected for a group consisting of: coding type, Group Of Pictures, frame type, frame size, and frame rate. In one embodiment, the coding type is intra coding.

In one embodiment the method further comprises the step of performing full decoding of said input bit-stream. In one embodiment, the full decoding comprises decoding down to a decoded pixels level.

In one embodiment the first encoding profile and the second encoding profile are selected from MPEG-2 and H.264. In one embodiment, the first encoding profile is MPEG-2. In one embodiment, the second encoding profile is H.264.

In one embodiment, the method further comprises the step of performing a coding decision step in said second encoding profile by selecting a prediction scheme. The method of claim 4 wherein said second encoding profile has the same coding mode associated with said first encoding profile.

In one embodiment, the method further comprises performing at least one of de-blocking and interpolation on said output video bit-stream having said second encoding profile.

In one embodiment a transcoder apparatus for transcoding an input video bit-stream having a first encoding profile into an output video bit-stream having a second encoding profile, said first encoding profile including motion estimation information, comprises: a front-end for extracting said motion estimation information from said input video bit-stream; and a back-end for constructing said output bit-stream, said front-end and said back-end being interconnected to pass said motion estimation information from said front-end on to said back-end, thereby avoiding motion estimation in constructing said output bit-stream with said back-end.

In one embodiment, the apparatus further comprises a least one buffer module interposed between said front-end and said back-end to pass said motion estimation information from said front-end on to said back-end. In one embodiment said first encoding profile has associated motion vectors and said front-end is configured to extract said motion vectors from said input video bit-stream, and pass said motion vectors on to said back-end.

In one embodiment, the apparatus said first encoding profile has associated quantization factors, and said front-end is configured to extract said quantization factors from said input video bit-stream, and pass said quantization factors on to said back-end. In one embodiment, said first encoding profile has at least one associated coding mode, and said front-end is configured to extract said at least one associated coding mode from said input video bit-stream, and pass said at least one associated coding mode on to said back-end.

In one embodiment, said at least one coding mode is selected for a group consisting of: coding type, Group Of Pictures, frame type, frame size, and frame rate. In one embodiment, the coding type is predictive coding.

In one embodiment, said front-end is configured to perform full decoding of said input bit-stream. In one embodiment said decoding is down to the decoded pixels level. In one embodiment said front-end and said back-end are configured to operate on encoding profiles selected from MPEG-2 and H.264. In one embodiment, said front-end is configured to operate on an MPEG-2 input bit-stream. In one embodiment, said back-end is configured to construct an H.264 output bit-stream.

In one embodiment, the apparatus further comprises a motion vector refinement block configured to operate on said motion vectors being passed on to said back-end. In one embodiment the motion vector refinement block is configured to generate a motion vector in said second encoding profile starting from a motion vector having a coarser pixel resolution in said first encoding profile. In one embodiment, the motion vector refinement block is configured to use a smaller motion compensation partition in said second encoding profile than in said first encoding profile. In one embodiment the back-end is configured to perform a coding decision step in said second encoding profile by selecting a prediction scheme. In one embodiment the back-end is configured to use in said second encoding profile the same coding mode associated with said first encoding profile. In one embodiment the back-end is configured to perform at least one of de-blocking and interpolation on said output video bit-stream having said second encoding profile.

In one embodiment, a computer-readable medium's contents cause a computing device to transcode an input video bit-stream having a first encoding profile into an output video bit-stream having a second encoding profile, by performing a method comprising: extracting motion estimation information from said input video bit-stream; and constructing said output video bit-stream using the extracted motion estimation information, thereby avoiding motion estimation in constructing said output bit-stream. In one embodiment, the computer-readable medium is a memory of a computing device. In one embodiment, the computer-readable medium is a data transmission medium transmitting a generated data signal containing the contents.

In one embodiment a system for transcoding an input video bit stream having a first encoding profile into an output video bit-stream having a second encoding profile, the system comprises: means for extracting motion estimation information from the input video bit-stream; means for constructing the output video bit-stream; and means for providing the extracted motion estimation information to the means for constructing the output video bit-stream.

In one embodiment, the means for extracting motion estimation information comprises means for extracting motion vectors from the input video bit-stream and the means for providing is configured to provide the extracted motion vectors to the means for constructing the output video bit-stream. In one embodiment, the means for extracting motion estimation information comprises means for extracting quantization factors from the input video bit-stream and the means for providing is configured to provide the extracted quantization factors to the means for constructing the output video bit-stream. In one embodiment, the means for extracting motion estimation information comprises means for extracting a coding mode from the input video bit-stream and the means for providing is configured to provide the extracted coding mode to the means for constructing the output video bit-stream.

BRIEF DESCRIPTION OF THE SEVERAL VIEWS OF THE DRAWINGS

Embodiments of the invention will now be described, by way of example only, with reference to the enclosed figures of drawing, wherein.

DETAILED DESCRIPTION OF THE INVENTION

As used herein, the expression "MPEG-2 to H.264 transcoding" will primarily indicate a conversion process of an MPEG-2 compressed video bit-stream into a new H.264 compressed video bit-stream.

Considerations for an MPEG-2 to H.264 transcoder process include:
bit-rate adaptation/reduction;
coding standard change;
image resolution modification;
frame rate reduction.

Preferably, transcoding, as opposed to re-encoding, will:
i) decrease significantly:
overall architecture complexity;
computational power;
memory requirement;
processing delay; and
ii) keep video quality as close as possible to the theoretical limit, by achieving the same or, preferably, a better quality than re-encoding.

"Re-encoding" is intended to mean the (largely inefficient) process of decoding the MPEG-2 bit-stream to recover therefrom a standard video signal which is in turn re-encoded into a H.264 bit-stream.

Figure 1:
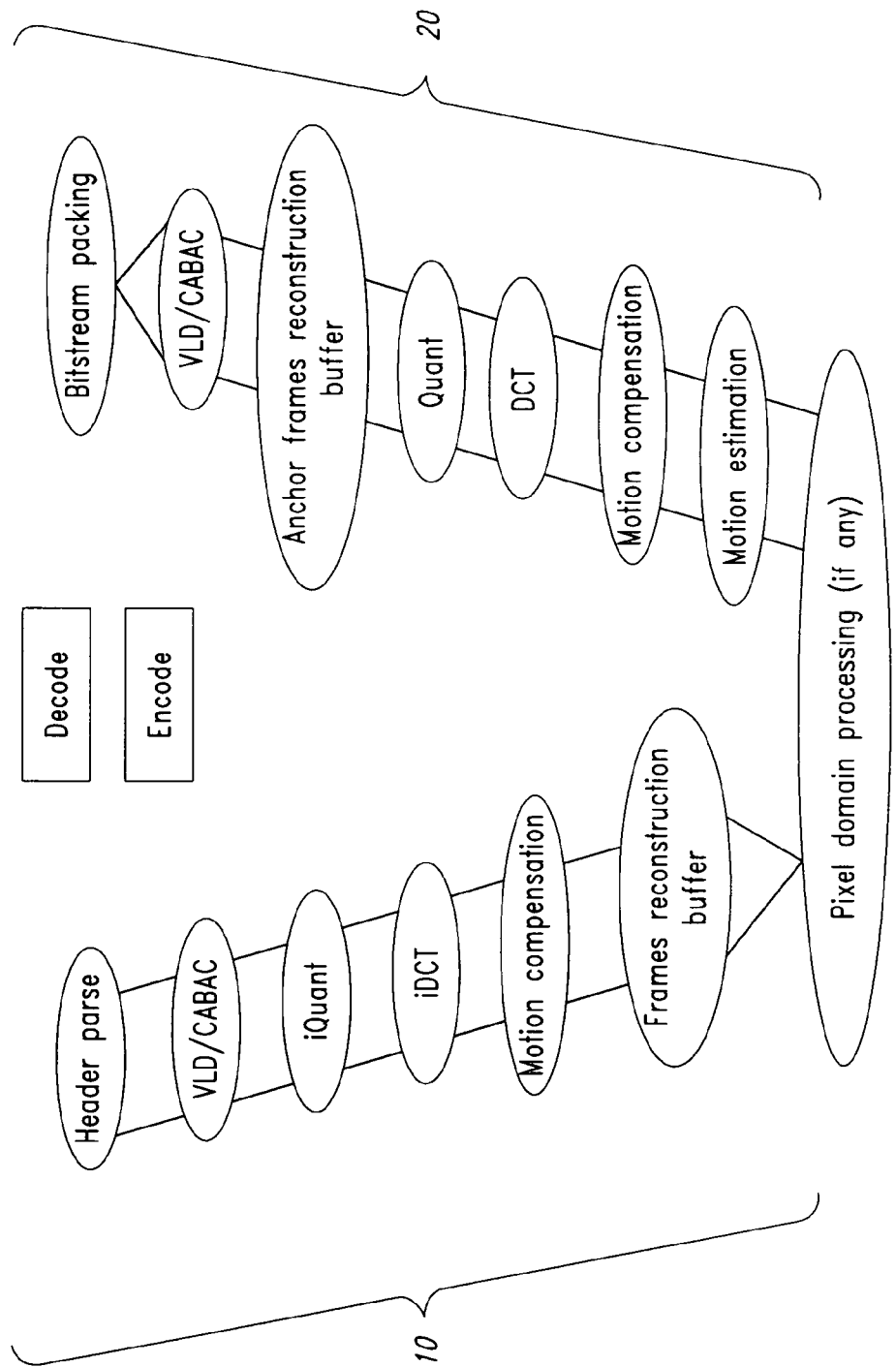
FIG. 1 shows a decode and re-encode process.

The term "transcoding" is sometimes improperly used to mean a process that is in fact a "re-encoding" process, typically involving a decoder and encoder in a "pipeline" arrangement. Such an arrangement, involving the cascade of a full decoding process and a full re-encoding process, is schematically shown in FIG. 1.

There, reference number 10 designates the decoding process, while reference number 20 designates the encoding process.

For example, to get an H.264 stream out of an MPEG-2 one by using re-encoding, in a first step the input bit-stream is decoded to get decoded pictures (so going down to the pixel domain). After that, in order to obtain the output bit-stream, in a second step all the H.264 encoding process steps are made: some of the encoding steps are computationally very expensive, like the motion estimation, and highly inefficient for this application, due to the quantization noise introduced by the original MPEG2 encoding.

In comparison to "re-encoding", transcoding offers the possibility of reuse as much as possible the information available from the input bit-stream to reduce the complexity of the system.

A similar approach has been used, e.g., in an MPEG-2-to-MPEG-2 dynamic rate shaper, as witnessed by the paper by L. Bortot, A. Chimienti, M. Lucenteforte, D. Pau and M. L. Sacchi, "An Innovative Low Complex MPEG-2 Video Transcoder Operating in the DCT Domain", IEEE-INTERNATIONAL CONFERENCE ON CONSUMER ELECTRONICS, IEEE Computer Society Press, pp. 312-313, Los Angeles, USA, June 2000. The purpose in Bortot was to reduce the rate within the same MPEG-2 standard, therefore enabling processing in the DCT domain. In the embodiment described herein the input is in MPEG-2 format and the output is in H.264 format. It will be appreciated that such an embodiment differs from the MPEG-2-to-MPEG-2 dynamic rate shaper that operates in the DCT domain.

In the illustrated embodiments of the invention, a partial decoding (e.g., header parsing, VLD, inverse quantization) is performed to extract features needed to code the output bit-stream.

The embodiment of the arrangement described herein is able to "transcode" an MPEG-2 Main Profile bit-stream into an H.264 Main Profile bit-stream by avoiding a full decoding/re-encoding process while ensuring a visual quality for a given input and output bit-rate that is equal or better in comparison with the case where full decoding and then full re-encoding are performed on the video bit-stream.

The complexity of the exemplary embodiments of the arrangement described herein is at least one order of magnitude lower than in the case of "re-encoding", due to the fact that expensive operations like Motion Estimation can be avoided.

Essentially, an embodiment of the arrangement can be described as coupling the "front-end" of an MPEG-2 decoder and the "back-end" of an H.264 encoder to share information coming from the input bit-stream parsed by the MPEG-2 decoder. Thus, syntax translation as well as bit-rate shaping can be achieved.

Figure 2:
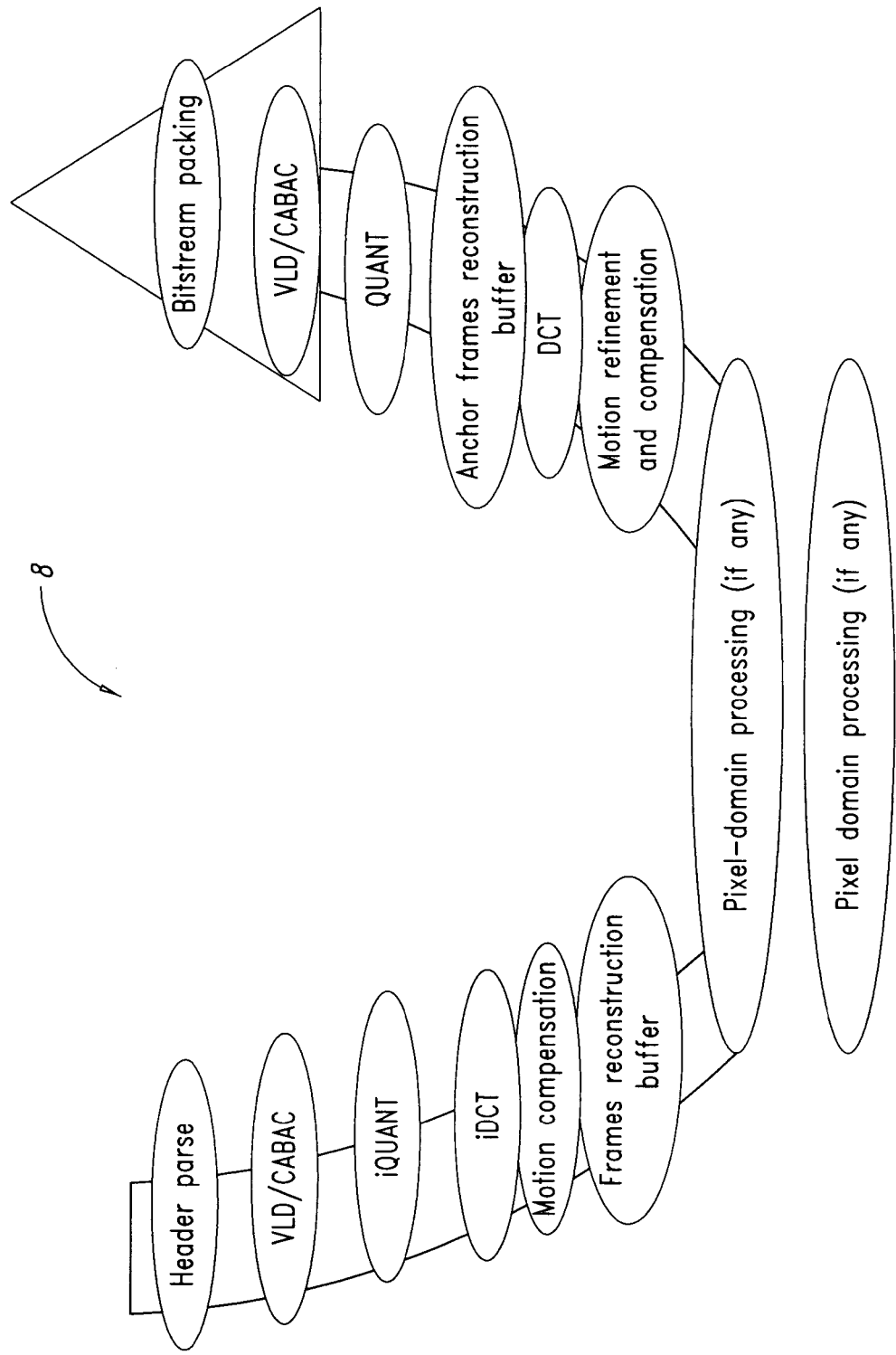
FIG. 2 shows a DBS MPEG-2 to H.264 transcoder flow diagram.

An embodiment described herein performs full input bit-stream decoding (so down to the decoded pixels level) to facilitate avoiding drift in the encoding phase; moreover, by passing decoded quantities like motion vectors, quantization factors and coding modes from the input MPEG2 front-end, an embodiment of the method is able to address the H.264 back-end, avoiding motion estimation, thus simplifying and optimizing the quantization and output bit-stream construction phase, as shown in FIG. 2.

Specifically, the embodiment of a method 8 of FIG. 2 described herein differs from the standard described in FIG. 1 for its capability of reusing as much as possible all the information included in the incoming MPEG2 stream in driving the encoding stage. In this way, the most computationally expensive task of the entire system (i.e., motion estimation) can be reduced at a pure refinement stage. This refinement is advantageous in view of the existing differences between the two standards, in term of motion vectors precision (in H.264 is ¼ of pixel, instead of ½ for the MPEG2, together with different filtering method to calculate the sub-pixels positions), coding modes (for example the intra prediction which does not exist in MPEG2), error transformation base (DCT 8×8 for MPEG2 versus DCT 4×4 for H.264). In this way, it is possible in some embodiments to avoid any kind of drift between encoder and decoder (i.e., the calculated and encoded error is exactly what is expected), maximizing the output quality (or minimizing the output bit-rate), and opening the possibility of any kind of processing on the decoded pixels (for example, frame size downsampling).

Reusing the "input side" information (i.e., all the extra coding information present in the bit-stream apart from the compressed sequence) is quite significant in order to maximize the output quality of the stream: as a rule, the original motion vectors are a better approximation of the real motion than recomputed vectors starting from the MPEG-2 quantized images. The standard "re-encoding" solution of FIG. 1, in fact, recalculates the motion vectors from scratch, and bases its prediction on anchor frames that are already quantized (and thus affected by errors): this implies that the encoding stage is not able to find and follow the real motion of the objects in the sequence, thus losing in accuracy both in terms of output quality and bit rate.

Conversely, the arrangement of the embodiment of FIG. 2 described herein is able to take advantage from the estimation performed at the broadcast encoder that produces the incoming high quality MPEG2 streams. Additionally, keeping track of the original quantization level helps in reducing the number of bits wasted to code the MPEG-2 quantization noise into the H.264 stream. The DBS of the embodiment of FIG. 2 here described works like a "fast encoder", where all the most important coding decisions are inferred from the input bit-stream.

Figure 3:
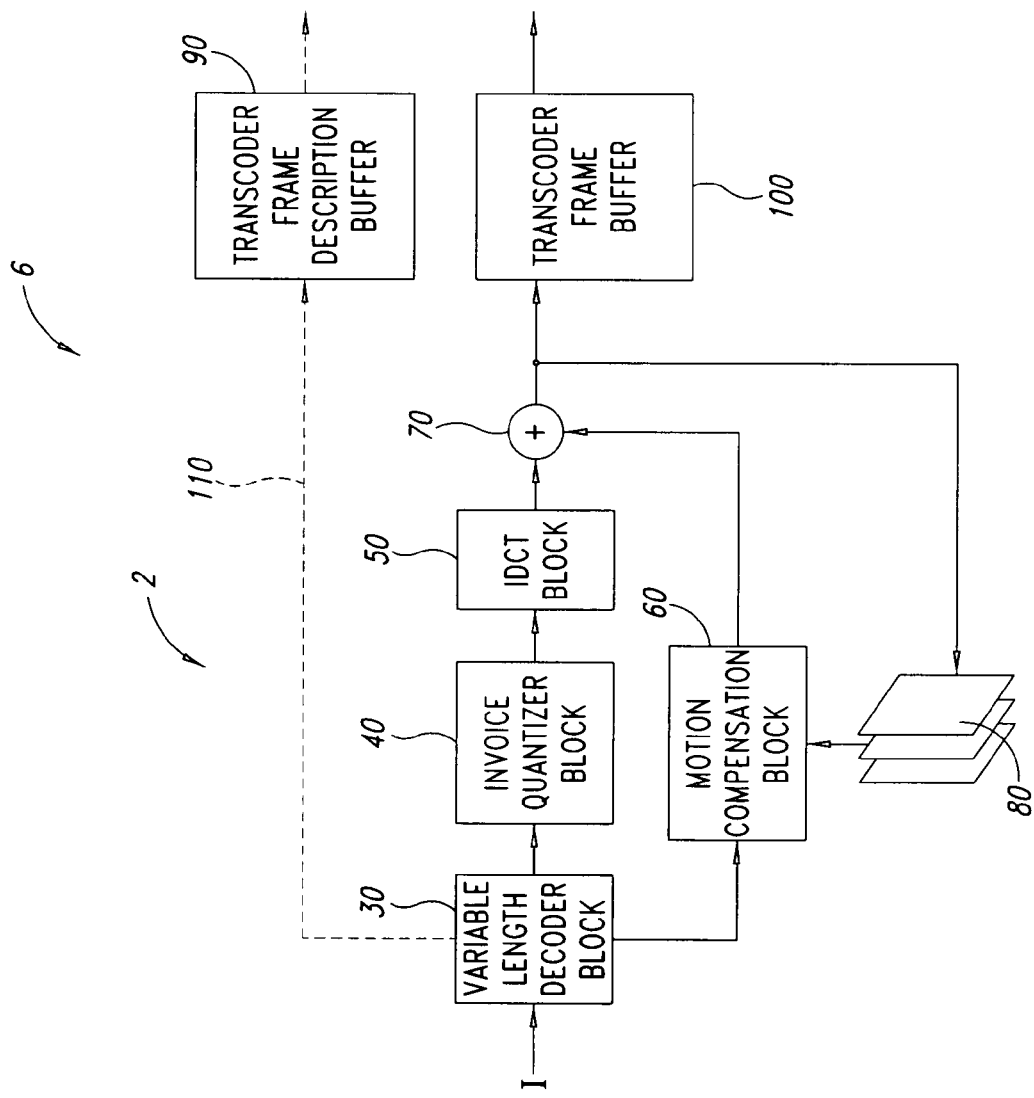
FIG. 3 shows a front-end block diagram.
Figure 4:
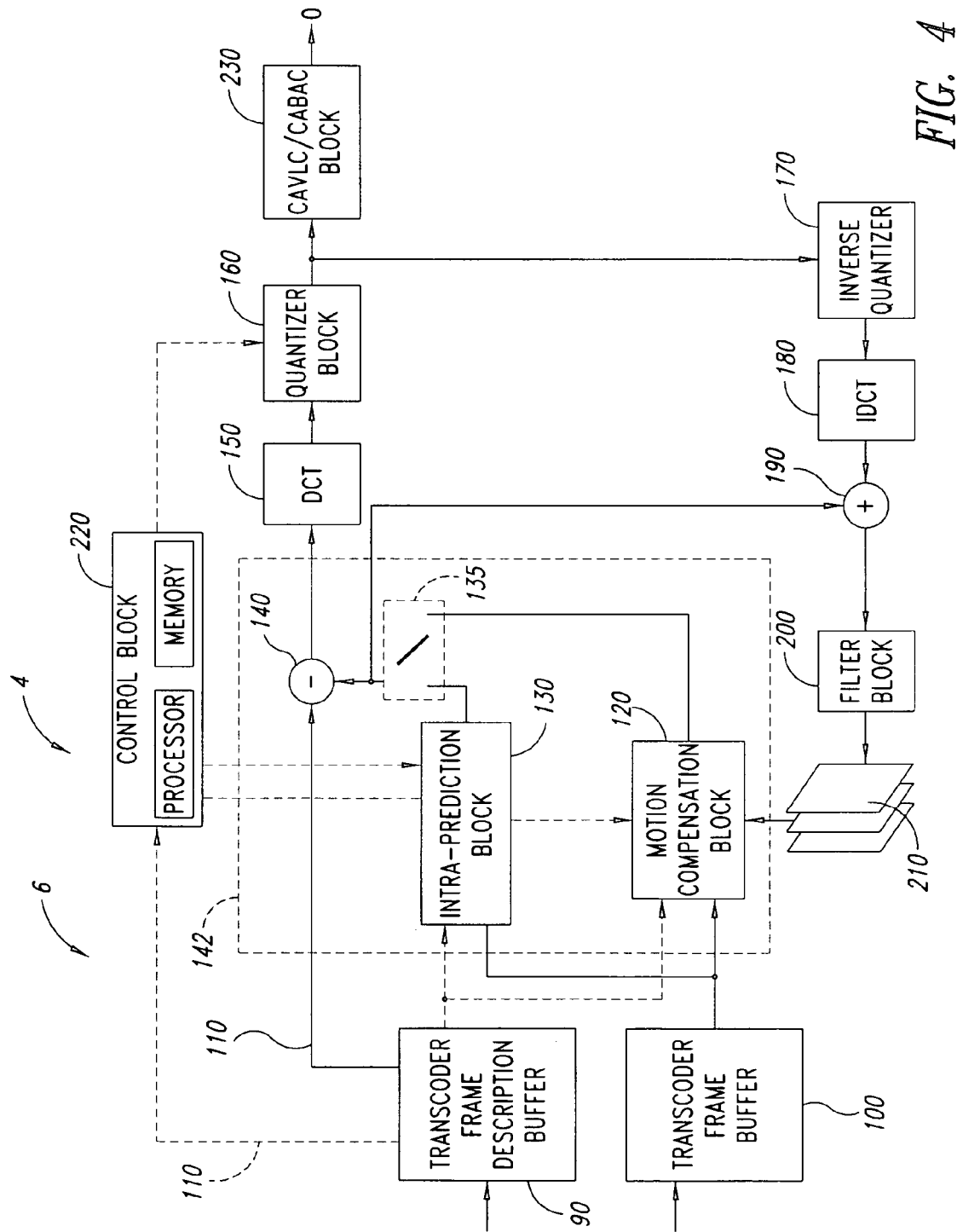
FIG. 4 shows a back-end block diagram.

A block diagram of an embodiment of the solution described herein is shown in FIGS. 3 and 4. Specifically, FIG. 3 shows the front-end 2 and FIG. 4 shows the back-end 4 of the transcoder 6.

The MPEG-2 bit-stream designated I is fed to a Variable Length Decoder (VLD) block 30, and then to an Inverse Quantizer (IQ) block 40. The output from block 40 is fed to an Inverse Discrete Cosine Transform (IDCT) block 50. The output from block 30 is also fed to a Motion Compensation (MC) block 60 that uses the information coming from a Local Frame Buffer 80.

The outputs from IDCT block 50 and MC block 60 are fed to a summation node 70.

In addition to being fed back to the Local Frame Buffer 80, the output from the summation node 70, which in fact represents a "decoded" image is fed to a Transcoder Frame Buffer 100.

Other information 110, like Motion Vectors, quantization values, coding decisions (e.g., intra or predicted coding) and other picture coding parameters like Group Of Pictures (GOP), frame type, frame size, and frame rate, are fed to a Transcoder Frame Description Buffer 90.

The H.264 encoding back-end 4 starts from this information (decoded frames in the Transcoder Frame Buffer 100, and encoding parameters in the Transcoder Frame Description Buffer 90) to start a "fast encoding" process by avoiding motion estimation and reusing all the corresponding settings from the MPEG-2 bit-stream.

The information coming from Transcoder Frame Description buffer 90 and Transcoder Frame buffer 100 (which buffers are represented in both FIGS. 3 and 4 for the sake of clarity) are fed to an Intra Prediction block 130 and to a Motion Compensation block 120. These two blocks are controlled through a Control block 220, which receives as input the information 110 from the Transcoder Frame Description Buffer 90. As illustrated, the Control block 220 comprises a processor 222 and a memory 224. The output from block 220 is a new quantization value that controls a Quantizer (Q) block 160.

A switch node 135 selects the output from the Intra Prediction block 130 or the output from the Motion Compensation block 120, and the output selected is connected to a subtraction node 140 and to a summation node 190. Node 140 calculates the difference among the selected output and the information 110 coming from the Transcoder Frame Description Buffer 90. MC block 120, Intra Prediction Block 130, switch node 135 and subtraction node 140 together comprise a motion vector refinement block 142.

A Discrete Cosine Transform (DCT) block 150 is connected with the output of the subtraction node 140. The Quantizer (Q) block 160 works on the output of the block 150 and the information from block 160 is fed to a so-called CAVLC/CABAC block 230. This block 230 performs adaptive reduction of the statistical redundancy (entropy coding: Context Adaptive Variable Length Coding—i.e., CAVLC- or Context-based Adaptive Binary Arithmetic Coding—i.e., CABAC). The information from block 160 is also fed back to an Inverse Quantizer 170. The output from block 230 is designated O and corresponds to the Output H.264 bit-stream.

The output from block 170 is fed to an Inverse Discrete Cosine Transform block 180. A summation block 190 receives as its input the selected output of switch 135 and the output from block 180. The sum is fed to a Filter block 200, which output is connected to a Local Frame Buffer 210. Local Frame Buffer 210 supplies information to Motion Compensation block 120.

The exemplary embodiment described herein therefore performs H.264 intra prediction and inter prediction starting from the MPEG-2 motion vectors. Optionally, a motion vector refinement can be performed, such as trying to find the best ¼ pixel motion vector staring from the MPEG-2 ½ pixel vector (i.e., a motion having a coarser pixel resolution), or checking the possibility to use a smaller motion compensation partition (e.g., motion compensated 8×8 blocks instead of 16×16 macro-blocks).

The exemplary embodiment described herein performs afterwards the H.264 coding decisions step, by selecting a best prediction scheme. Optionally, the decision process can be shortened by just enforcing the same decision that MPEG-2 performs. After that, the H.264 frequency transform is computed. Then a quantization is made, re-using the MPEG-2 quantization setting as starting point, in order not to over- or under-quantize the macro-block under processing.

The anchor frame is reconstructed, and optionally loop filtering can be applied. If needed, any kind of processing in the decode images can be added in the Transcoding Frame Buffer, before encoding in H.264, without any drift noise added.

For example, de-blocking, interpolation, and so on, can be applied without affecting the process.

The MPEG-2 block standard uses only one Discrete Cosine Transform based on an 8×8 pixel matrix, while H.264 have three types of transformations depending on the type of data to encode.

There are a 4×4 transformation for DC luminance coefficients of INTRA macro-blocks into 16×16 coding mode, a 2×2 transformation for DC chrominance coefficients and a 4×4 DCT transformation for the rest of blocks/macro-blocks coding mode.

Figure 5:
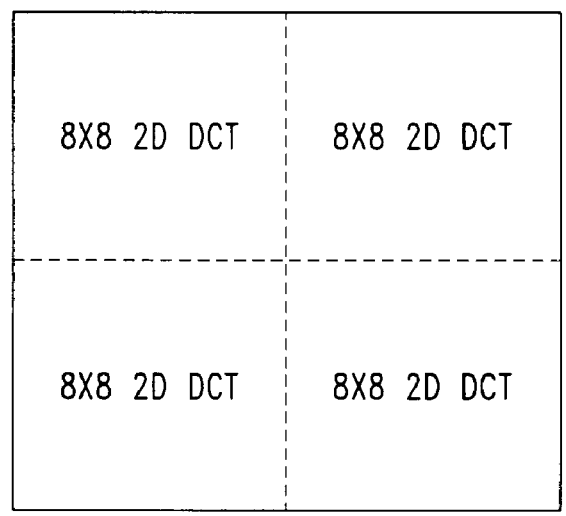
FIG. 5 shows an example of MPEG-2 macro-block structure.

FIG. 5 shows an example of MPEG-2 macro-block structure. The 4×4 DCT transformation used by H.264 is strongly optimized and integrated with the quantization system implemented into the standard. The 4×4 matrix of residual pixel coefficients is transformed by the equation:

$$Y = A \times A^T$$
$$= \begin{bmatrix} a & a & a & a \\ b & c & -c & -b \\ a & -a & -a & a \\ c & -b & b & -c \end{bmatrix} \cdot [X] \cdot \begin{bmatrix} a & b & a & c \\ a & c & -a & -b \\ a & -c & -a & b \\ a & -b & a & -c \end{bmatrix}$$

$$a = 1/2$$

$$b = \sqrt{\frac{1}{2}} \cdot \cos\left(\frac{\pi}{8}\right)$$

$$c = \sqrt{\frac{1}{2}} \cdot \cos\left(\frac{3\pi}{8}\right)$$

which is factorized into the form:

$$Y = (C \times C^T) \otimes E$$
$$= \left(\begin{bmatrix} 1 & 1 & 1 & 1 \\ 1 & d & -d & -1 \\ 1 & -1 & -1 & 1 \\ d & -1 & 1 & -d \end{bmatrix} \cdot [X] \cdot \begin{bmatrix} 1 & 1 & 1 & d \\ 1 & d & -1 & -1 \\ 1 & -d & -1 & 1 \\ 1 & -1 & 1 & -d \end{bmatrix}\right) \otimes$$

$$\begin{bmatrix} a^2 & ab & a^2 & ab \\ ab & b^2 & ab & b^2 \\ a^2 & ab & a^2 & ab \\ ab & b^2 & ab & b^2 \end{bmatrix}$$

In the H264 standard only $C \times C^T$ is used to form the transform "core". To simplify the implementation d is rounded to 0.5, and to ensure the orthogonality, b is modified to obtain:

$$T^{-1}[T(X)] = X \Rightarrow a = \frac{1}{2} \quad b = \sqrt{\frac{2}{5}} \quad d = \frac{1}{2}$$

For these reasons the 4×4 transformation is called "DCT-like".

Thanks to rounding, the implementation of the core uses only sums and binary shifts. Fixing the transformation technique into the standard avoids introducing mismatches between encoder and decoder, and does not need a conformance decoder IDCT specification like in MPEG-2.

The pre/post-scaling matrix is part of the DCT H.264 transform. It is not implemented into the core, but it is integrated in the quantizer system.

$Y=(C \cdot X \cdot C^T) \otimes E$ E:pre/post scaling matrix

There is no simple way for converting the 8×8 DCT input coefficients in the H.264 form. In order to change the type of DCT transform into the DCT domain, "non sparse" matrixes are used, mainly due to the cosine coefficients. It is therefore more convenient to decode down to the pixel level, and extract important information to perform a fast encoding phase.

In that way, all the optimized methods of fast DCT (forward/backward) can be used.

One item of information retrievable from the input is the quantization choice of the original MPEG-2 encoder.

Figure 6:
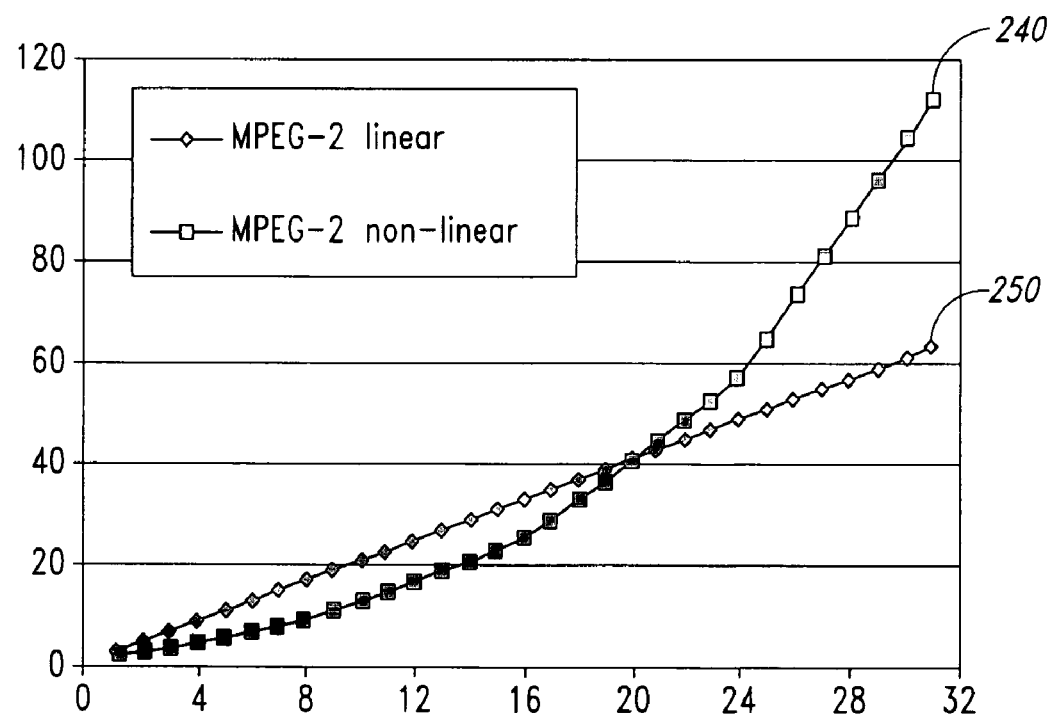
FIG. 6 shows MPEG-2 quantization scales.
Figure 7:
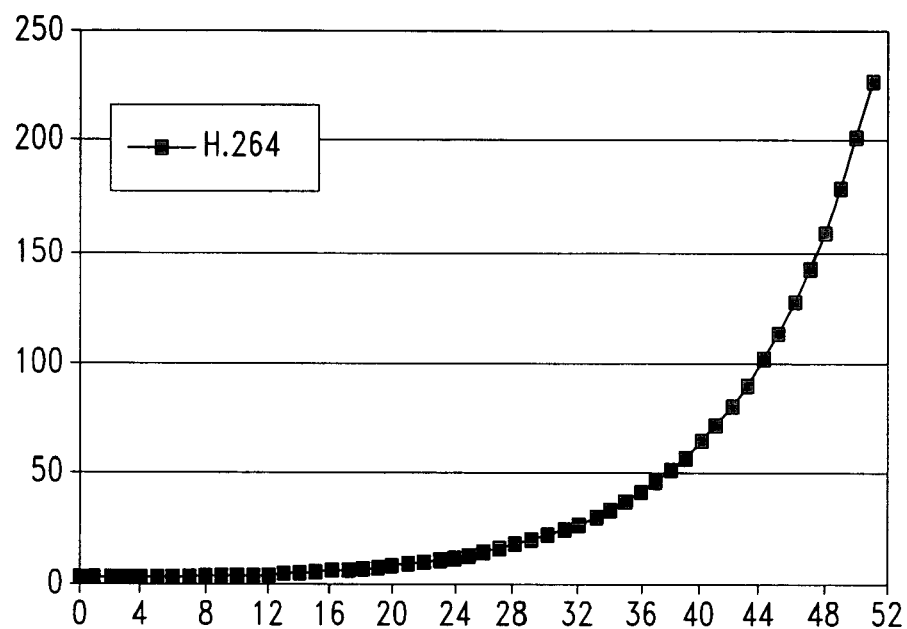
FIG. 7 shows H.264 quantization scale.

The MPEG-2 standard has two quantization scales: the linear 250 and the non-linear 240 scales as shown in FIG. 6. FIG. 7 shows the H.264 quantization scale.

The AC-DCT coefficients of each 16×16 pixel macro-block are quantized by a single value from the used scale, on the base of the four 8×8 DCT transform in a macro-block. MPEG-2 has a user-definable quantization matrix where the user can define a different quantization weight for each one of the 64 DCT coefficients, so to effectively shape quantization on the different spatial frequencies. Normally, higher spatial frequencies have higher quantization, therefore a higher value in the quantization matrix. So, the effective quantization value for each coefficient, is given by the quantization value aforesaid multiplied by the quantization matrix value for each coefficient. The total quantization effect can be changed by having higher quantization matrix value, but also the relative quantization strength can be changed among the coefficients. For example, a "flat" matrix (with all coefficients very similar) will not penalize high-frequency values, while a "steep" matrix (with hi-frequency coefficients much higher then low-frequency ones) will produce heavy quantization in high-frequency zone. Both the quantization value and the quantization matrix are controlled.

The H.264 standard has only one quantization scale, optimized to control the output bit-rate, which include also the E pre/post-scaling matrix of the DCT transformation. H.264 uses a scalar quantizer (modified to reduce the "dead zero zone") and the implementation totally avoids floating-point division and multiplication.

The basic equation is the following, known from theory:

$$Z = \mathrm{round}\left(\frac{Y}{Q_{step}}\right); \quad Q_{step} = f(QP); \quad Y = C \cdot X \cdot C^T$$

where $Y_{ij}$ is the coefficient of Y matrix obtained through the 4×4 DCT core. The standard uses 52 values of $Q_{step}$ indexed for the parameter QP (Quantization Parameter). The $Q_{step}$ value from the corresponding QP is determined by an exponential relation, which is very different from MPEG-2.

Qstep doubles in value each six increments of QP. Approximately an increment of one in QP means an increment of 12% in Qstep and a reduction of 12% of the output bit-rate. Therefore, a variation of +6 of the control variable QP means a reduction of 50% of the output bit-rate. For this reason the implementation of the quantization system uses a six rows look-up table, which is cyclically used with binary shifts.

The scaling factors $a^2$, $ab/2$, or $b^2/4$ of E matrix are integrated into the forward quantizer. The input block is transformed by the core to give a block of not scaled coefficients $W=CXC^T$. Then each coefficient $W_{ij}$ is quantized and scaled in a single step operation:

$$Z_{ij} = \mathrm{round}\left(Wij \cdot \frac{PF}{Q_{step}}\right)$$

where PF is Prescaling Factor depending on the position (ij).

| Position | | | | PF |
|---|---|---|---|---|
| (0, 0) | (2, 0) | (0, 2) | (2, 2) | $a^2$ |
| (1, 1) | (1, 3) | (3, 1) | (3, 3) | $b^2/4$ |
| Other | | | | $ab/2$ |

The factor $PF/Q_{step}$ is implemented in the H.264 Reference Model as a multiplication by a Multiplier Factor (MF) and a right shift, thus avoiding any division.

$$Z_{ij} = \mathrm{round}\left(W_{ij} \cdot \frac{MF}{2^{qbits}}\right); \quad 2^{-qbits} = \mathrm{right\_shift}(q) \text{ where:}$$

$$\frac{MF}{2^{qbits}} = \frac{PF}{Q_{step}} \text{ and } qbits = 15 + \mathrm{floor}\,(QP/6)$$

This is implemented in integer arithmetic as $$Z_{ij} = (W_{ij} \cdot MF + f) >> q\mathrm{bits}$$

where f is a correction factor (to reduce mismatch errors and dead zone) and it is:

$$f = 2^{qbits}/3 \text{ for intra macro-blocks,}$$

$$f = 2^{qbits}/6 \text{ for inter macro-blocks.}$$

Due to the particular structure of the quantizer, H.264 uses a small look-up table of six rows of:

| | Position | Position | Position | Qstep |
|---|---|---|---|---|
| MF | (0, 0) | (1, 1) | Other | |
| | (2, 0) | (1, 3) | | |
| QP | (2, 2) | (3, 1) | | |
| | (0, 2) | (3, 3) | | |
| 0 | 13107 | 5243 | 9066 | 0.6250 |
| 1 | 11916 | 4660 | 7490 | 0.6875 |
| 2 | 10082 | 4194 | 6554 | 0.8125 |
| 3 | 9362 | 3647 | 5825 | 0.8750 |
| 4 | 8192 | 3355 | 5243 | 1.0000 |
| 5 | 7282 | 2893 | 4559 | 1.1250 |

For QP>5, the factor MF remains unchanged but the divider ($2^{qbits}$) increases by a factor of two for each increment of QP. Starting from these equations it is clear that during the DBS coding phase it is necessary to choose the QP that better approximates input MPEG-2 pixel values. H.264 has not got a user definable quantization matrix, as this is hard-coded and fused with DCT scaling factors, for more efficient implementation. It is therefore understood that in H.264 there are no means to change the 'default' quantization matrix. User-defined weights of DCT coefficients in MPEG-2 cannot be followed. Another challenge is due to the fact that in MPEG-2 there are 8×8 (user definable) quantization matrixes, while in H.264 we have (hard-coded) 4×4 matrix.

A first direct mathematical relationship can be found comparing the real quantization step into the two standards: possibly, the contribution from the quantization matrix that could be present in MPEG-2, is implicitly integrated in the final quantization step. In particular, starting from the H.264 (referring to ITU-T Rec. H.264/ISO/IEC 11496-10), the relation among Qp (x-axis) and Qstep (y-axis) can be plotted in a graph: by finding the regression curves, the following exponential can be obtained:

$$Q\text{step} = e^{-0.47 + Qp*0.1155}$$

Thus, the modulating line is the exponent of in the previous formula, and it can be used to map the incoming MPEG2 mquant as follow:

$$Qp = [\ln(m\text{quant}) + 0.47]/0.1155$$

Figure 8:
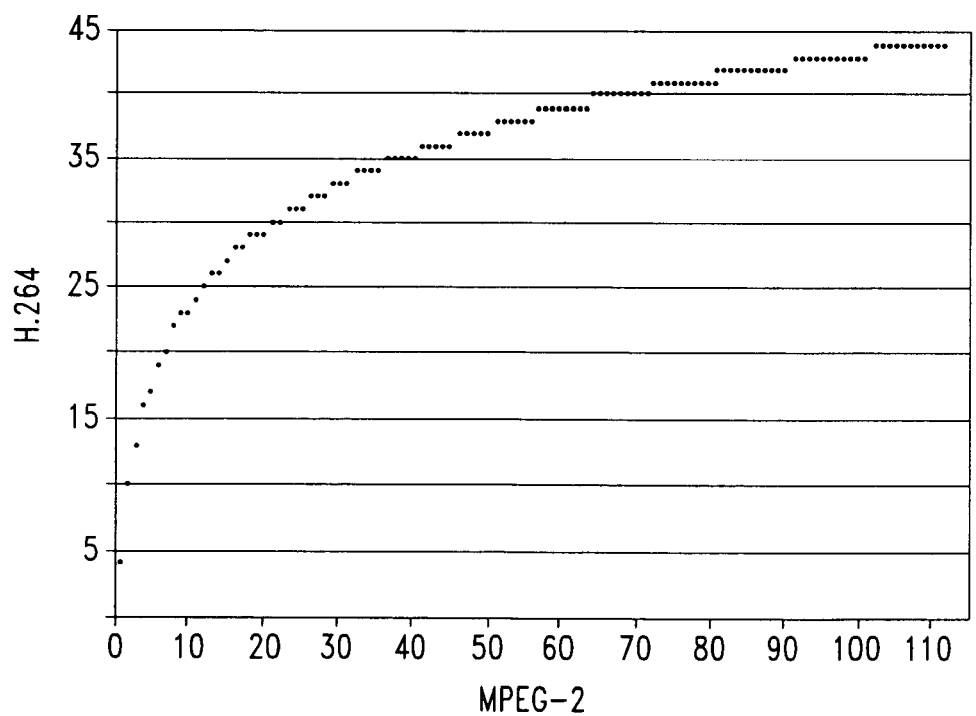
FIG. 8 shows direct mapping of MPEG-2 Q scale into H.254 scale.

FIG. 8 shows on the x-axis the input MPEG-2 quantization value (mquant) and on the y-axis the corresponding H.264 QP computed (with approximation) by the equation Qstep=QP.

A multi-to-one relation is represented, especially from mquant=20 to mquant=40, which is a very common range for D1 MPEG-2 bitstream at medium bitrates.

This means that there is not a bi-univocal relationship, and this is the first reason for a mismatch during the transcoding process. The effect is that H.264 quantization steps are much coarser than MPEG-2 ones in the most commonly used values, and this leads to more coarsely quantized coefficients and ultimately lower quality, if no particular care is taken in the translation.

The exemplary embodiment described herein selects the best MPEG-2 to H.264 quantizer translation relationship; a new relationship was developed on the basis of visual quality tests. This relationship uses also the information of INTRA/INTER quantization matrix, which are present only into MPEG-2 standard into the sequence header. These matrixes are a free variable of MPEG-2, while are not present in H.264, as they are "hard-coded" and integrated with the pseudo-DCT and quantization process. This means that to achieve a correct quantization translation these matrixes have to be considered: input bit-stream that can heavily influence the real quantization step (mquant).

Figure 9:
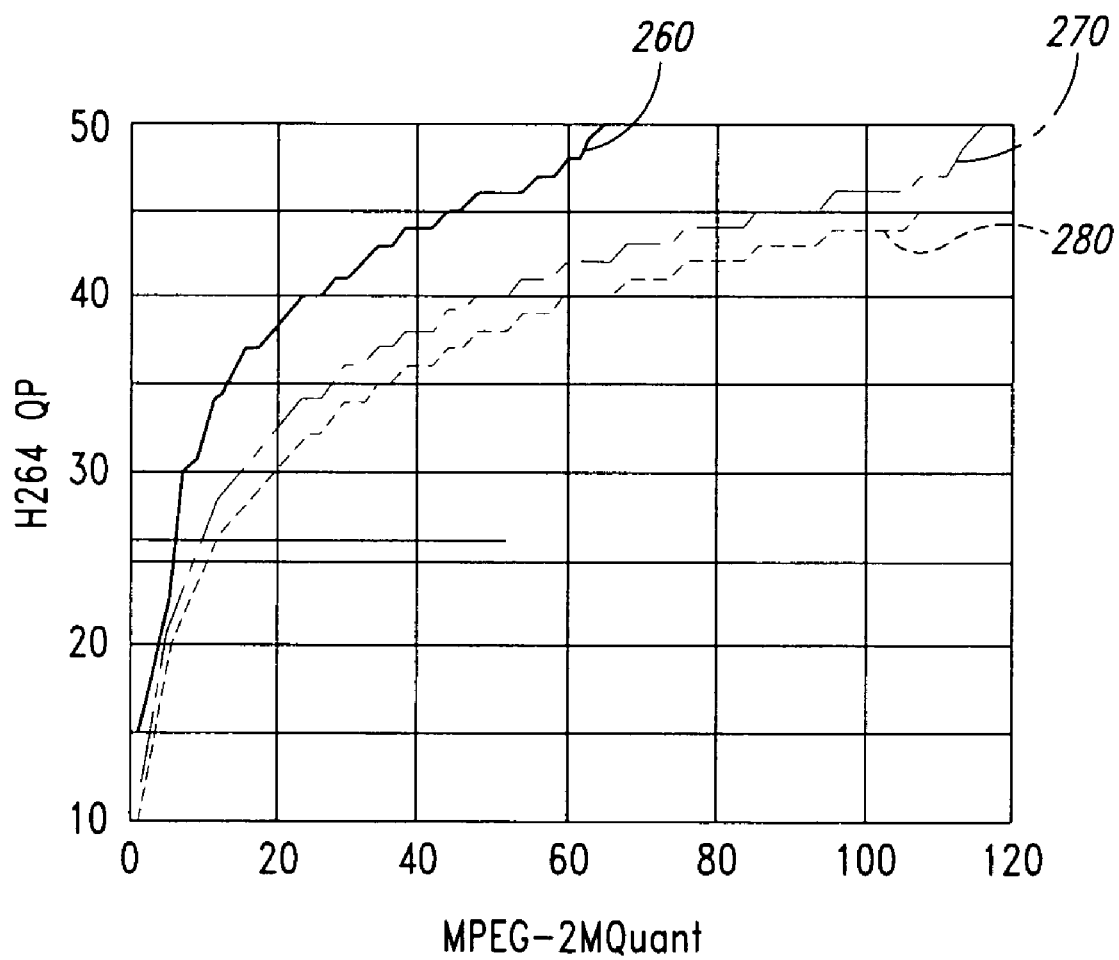
FIG. 9 shows different optimal translation depending on MPEG-2 quantization matrixes.

FIG. 9 shows the results obtained via various tests (including visual tests) over a wide spectrum of MPEG-2 bit-streams (using different quantization matrixes) transcoded into H.264 at equal visual quality. Input bit-rates are from 3 to 15 Mbit/s on D1 sequences (PAL or NTSC).

The first curve, 260, is the "mathematical" relation discussed before (i.e., without taking quantization matrixes into consideration) while the second curve, 270, is the best fitting curve for a standard INTRA/INTER quantization matrix. The third is the curve, 280, for a quantization matrix with high values.

The fact that these matrixes are considered, and the fact that in H.264 do not exist a correspondent tool (as the matrix has been fixed once and for all at the standardization phase) poses a new challenge for what regards translation of quantization values from MPEG-2 to H.264. In fact, the matrixes can re-modulate not only the absolute value of the quantization, but also the relative quantization level among the different quantization coefficients: theoretically "flat" matrixes can be considered (i.e., where low-frequency coefficients are quantized as much as hi-frequency ones) or "steep" matrixes, where the hi-frequency coefficient are quantized much more than the DC value. Although one could devise a mathematical optimal solution (e.g., least square error optimization), given the MPEG-2 Qp, the MPEG-2 quantization matrix used, the fixed H.264 quantization matrix, and the available H.264 quantization scale, a different scheme has also been implemented because mathematical computation is often impractical in real-time consumer devices.

For example, the least square approximation can be computed: i.e., the best H.264 Qp that minimizes the error between the reconstructed MPEG-2 pixels and the H.264 ones for each macro-block, but this would require very high computation to achieve the optimum.

Experimentally, with good approximation, it is possible to use the first curve with an offset computed on the base of low frequency coefficients of INTRA/INTER MPEG-2 quantization matrix. Specifically, only the first 2×2 or 3×3 coefficients are important to compute this offset.

Offset = function $[LowFreq(Qmatrix)]$

In the solution described herein:

Weight = mean(mean($LowFreq(Qmatrix)$));

Offset = Weight/(2 + weight>>6);

$QP[Mquant] =$

{4, 10, 13, 16, 17, 19, 20, 22, 23, 23, 24, 25, 26, 26, 27, 28, 28, 29, 29, 29, 30, 30, 30, 30, 30, 31, 31, 31, 32, 32, 32, 33, 33, 33, 33, 34, 34, 34, 34, 34, 34, 34, 34, 34, 34, 35, 35, 35, 35, 35, 36, 36, 36, 36, 36, 36, 37, 37, 37, 37, 37, 37, 37, 37, 40, 40, 40, 40, 40, 40, 40, 41, 41, 41, 41, 41, 41, 41, 41, 41, 42, 42, 42, 42, 42, 42, 42, 42, 42, 42, 43, 43, 43, 43, 43, 43, 43, 43, 43, 43, 44, 44, 44, 44, 44, 44, 44, 44, 44, 44, 44, 44, 44, 44, 44, 44, 44, 44}

Yet, this might not still be the optimal solution. New H264 compression tools, like for example luma prediction and skipping or direct prediction in B frames, heavily influence the whole process of output bit-stream quantization.

Under the hypothesis of getting the optimal QP, which minimizes the quantization error with respect to the input data, it is possible that this is an undesirable value due to, for example, a good intra prediction. The MPEG-2 standard codes DCT coefficient of a macro-block without any prediction or (that is the same) on the base of a flat "zero" prediction. Also H.264 uses only one QP value for each 16×16 macro-block, but into the pixel domain it makes a luma prediction that returns a more uncorrelated (and hopefully lower) signal error with respect to the input data.

There are nine directional prediction modes for the 4×4 luma prediction and four prediction modes for 16×16 luma prediction. During the DBS processing it is possible that one ore more predictions are so efficient that a residual error is concentrated in the high frequencies. This error is quantized based on the MPEG-2 information mquant and mainly erased, generating visible artefacts. It is possible, during the feature extraction phase (that means while parsing the input bit-stream), to evaluate the degree of "predictability" of input pixel within each macro-block, to make a right correction of final coding QP.

To do that, several gradients on the DCT coefficient of each block will be calculated (horizontal, vertical and diagonal): in a general case, the errors should be concentrated in a low frequency zone of each block, decreasing fast in the direction of higher frequency; unfortunately sometimes this is not true and also some high frequency coefficient are very important for subjective final visual quality (typical example is a small edge over two distinct flat zones: this will be translated in few high frequency coefficients reserved in the transcoded block, because, otherwise, the edge will be lost in the final images). If one or more of the gradients will be "flat" (so there is some important high frequency coefficient), the pre-calculated quantization step will be reduced; otherwise it will be reserved as it is.

The translation relationship has two distinct zones, which can be called high-quality zone, and mid-low quality zone. In the high quality zone (and thus low compression), optimal visual and objective quality are present. The border of this region is around H.264 QP values of 24-28. Above this threshold, quality decreases very fast. Among QP values of 25-30, very different visual results can be obtained, depending on the sequence to be encoded.

If the high-quality region is considered and the result of the gradient analysis described above tells to increase the quantization (so this is the case of good prediction), the quantization can be stronger referred to MPEG2 translation, achieving higher bit-stream compression and good visual quality. Actually, in this region of QP values, a small QP changes can be found, which do not effect visual quality, but that have big impact on generated bit-rate, i.e., can compress much more of the sequence.

Otherwise, in the low-quality-high compression zone, the quantization step is not increased, because the compression is already hardly, and no new quantization artifacts can be added.

Another important information get from the input bit-stream is the motion vectors field computed by the original MPEG-2 encoder. Both the standards are block based and the new prediction modes of H.264 can be considered as a super-set of the MPEG-2 modes.

H.264 uses a "tree structured motion compensation system" and supports block sizes from 4×4 to 16×16 with many intermediate options. For a 16×16 macro-block only one QP and four split options are considered.

In particular only for the 8×8 macro-block partition there are four submacro-blocks partitions. Apart from this tree structure, the DCT is only 4×4 pixel based (without ABT).

The motion information from MPEG-2 is based on a 16×16 partition where each macro-block has one (or two for bi-directionally predicted pictures) motion vectors (for progressive frame picture) or one, two, four (maximum for field bi-directional prediction) motion vectors (for interlaced frame picture). A first transcoding solution is to map the MPEG-2 motion vectors field into a grid compatible with H.264 specifications and therefore maintaining only the 16×16 partition tree mode.

The MPEG-2 motion vector are mapped into the H.264 grip and used as the MV to predict the H.264 macro-block to encode.

After having motion compensated or intra-predicted, transformed and quantized the macro-block the standard H.264 encoding flow continues to output an H.264 compliant bit-stream.

Those of skill in the art will promptly appreciate that while the exemplary embodiment of the invention described is adapted to "transcode" an MPEG-2 Main Profile bit-stream into an H.264 Main Profile bit-stream, the same basic principles may be applied, should the need arise, to transcoding an H.264 Main Profile bit-stream into an MPEG-2 Main Profile bit-stream, or to transcoding between any of two different profile video bit-streams. This by avoiding a full decoding/re-encoding process while ensuring a visual quality for a given input and output bit-rate that is equal or better in comparison with the case where full decoding and then full re-encoding are performed on the video bit-stream.

Consequently, without prejudice to the underlying principles of the invention, the details and the embodiments may vary, also appreciably, with reference to what has been described by way of example only, without departing from the scope of the invention as defined by the annexed claims.

The invention claimed is:

1. A method, comprising:
extracting motion estimation information from an input video bit-stream with a first encoding profile including the motion estimation information and having associated quantization factors including a user-definable quantization matrix and a quantization value;
passing said extracted motion estimation information on to an output video bit-stream with a second encoding profile having associated quantization factors including a hard-coded quantization matrix and a quantization scale;
extracting said quantization factors from said input video bit-stream;
passing said extracted quantization factors on to said output video bit-stream; and
translating the extracted quantization value into a quantization scale for the output bit-stream.

2. The method of claim 1 wherein said first encoding profile has associated motion vectors and the method further comprises the steps of:
extracting said motion vectors from said input video bit-stream; and
passing said motion vectors on to said output video bit-stream.

3. The method of claim 2, further comprising a motion vector refinement step.

4. The method of claim 3 wherein said motion vector refinement step comprises generating a motion vector in said second encoding profile starting from a motion vector having a coarser pixel resolution in said first encoding profile.

5. The method of claim 3 wherein said motion vector refinement step comprises using a smaller motion compensation partition in said second encoding profile than in said first encoding profile.

6. The method of claim 1 wherein said first encoding profile has at least one associated coding mode and the method further comprises the steps of:
   extracting said at least one coding mode from said input video bit-stream; and
   passing said at least one coding mode on to said output video bit-stream.

7. The method of claim 6 wherein said at least one coding mode is selected for a group consisting of: coding type, Group Of Pictures, frame type, frame size, and frame rate.

8. The method of claim 7 wherein the coding type is intra coding.

9. The method of claim 6 wherein said second encoding profile has the same coding mode associated with said first encoding profile.

10. The method of claim 1, further comprising the step of performing full decoding of said input bit-stream.

11. The method of claim 10 wherein the full decoding of said input bit-stream comprises decoding down to a decoded pixels level.

12. The method of claim 1 wherein said first encoding profile is MPEG-2.

13. The method of claim 1 wherein said second encoding profile is H.264.

14. The method of claim 1, further comprising the step of performing a coding decision step in said second encoding profile by selecting a prediction scheme.

15. The method of claim 1, further comprising performing at least one of de-blocking and interpolation on said output video bit-stream having said second encoding profile.

16. The method of claim 1 wherein the translating is based on quantization factors of the user-definable quantization matrix.

17. A transcoder apparatus, comprising:
   a front-end configured to:
      receive an input video bit-stream having with a first encoding profile including motion estimation information and associated quantization factors including a user definable quantization matrix and a quantization value; and
      extract the motion estimation information and the quantization factors from the input video bit stream; and
   a back-end coupled to the front end and configured to translate the extracted quantization value into a quantization scale and to construct an output bit-stream based on the extracted motion estimation information and the extracted quantization factors, the output bit-stream having a second encoding profile with associated quantization factors including a hard-coded quantization matrix and the quantization scale.

18. The apparatus of claim 17, further comprising a least one buffer module interposed between said front-end and said back-end and configured to pass said motion estimation information from said front-end on to said back-end.

19. The apparatus of claim 17 wherein said first encoding profile having associated motion vectors, said front-end is configured to extract said motion vectors from said input video bit-stream, and pass said motion vectors on to said back-end.

20. The apparatus of claim 19, further comprising a motion vector refinement block configured to operate on said motion vectors being passed on to said back-end.

21. The apparatus of claim 20 wherein said motion vector refinement block is configured to generate a motion vector in said second encoding profile starting from a motion vector having a coarser pixel resolution in said first encoding profile.

22. The apparatus of claim 20 wherein said motion vector refinement block is configured to use a smaller motion compensation partition in said second encoding profile than in said first encoding profile.

23. The apparatus of claim 17 wherein said first encoding profile having at least one associated coding mode, said front-end is configured to extract said at least one associated coding mode from said input video bit-stream, and pass said at least one associated coding mode on to said back-end.

24. The apparatus of claim 23 wherein said at least one coding mode is selected for a group consisting of: coding type, Group Of Pictures, frame type, frame size, and frame rate.

25. The apparatus of claim 24 wherein the coding type is predictive coding.

26. The apparatus of claim 23 wherein said back-end is configured to use in said second encoding profile the same coding mode associated with said first encoding profile.

27. The apparatus of claim 17 wherein said front-end is configured to perform full decoding of said input bit-stream.

28. The apparatus of claim 27 wherein said front-end is configured to decode said input bit-stream down to the decoded pixels level.

29. The apparatus of claim 17 wherein said front-end is configured to operate on an MPEG-2 input bit-stream.

30. The apparatus of claim 17 wherein said back-end is configured to construct an H.264 output bit-stream.

31. The apparatus of claim 17 wherein said back-end is configured to perform a coding decision step in said second encoding profile by selecting a prediction scheme.

32. The apparatus of claim 17 wherein said back-end is configured to perform at least one of de-blocking and interpolation on said output video bit-stream having said second encoding profile.

33. The apparatus of claim 17 wherein the back-end is configured to translate the quantization value into the quantization scale based on quantization factors of the user-definable quantization matrix.

34. A non-transitory computer-readable medium storing instructions that when executed cause at least one computing device to transcode an input video bit-stream having a first encoding profile into an output video bit-stream having a second encoding profile, by performing a method comprising:
   extracting motion estimation information from said input video bit-stream, the first encoding profile having associated quantization factors including a user-definable quantization matrix and a quantization value;
   extracting the quantization factors from the input video bit-stream;
   translating the extracted quantization value into a quantization scale; and
   constructing said output video bit-stream using the extracted quantization factors and the extracted motion estimation information, the second encoding profile having associated quantization factors including a hard-coded quantization matrix and the quantization scale.

35. The non-transitory computer-readable medium of claim 34 wherein the computer-readable medium is a memory of the at least one computing device.

36. The non-transitory computer-readable medium of claim 34 wherein the translating the extracted quantization value is based on quantization factors of the user-definable quantization matrix.

37. A system for transcoding an input video bit stream having a first encoding profile into an output video bit-stream having a second encoding profile, the system comprising:
- means for extracting motion estimation information from the input video bit-stream, the first encoding profile including the motion estimation information and associated quantization factors including a user-definable quantization matrix and a quantization value;
- means for extracting the quantization factors from the input video bit-stream;
- means for translating the quantization value into a quantization scale; and
- means for constructing the output video bit-stream based on the extracted motion information and extracted quantization factors, the second encoding profile having associated quantization factors including a hard-coded matrix and the quantization scale.

38. The system of claim 37 wherein the means for extracting motion estimation information comprises means for extracting motion vectors from the input video bit-stream and the means for constructing is configured to use the extracted motion vectors to construct the output video bit-stream.

39. The system of claim 37 comprising means for extracting a coding mode from the input video bit-stream and the means for constructing is configured to use the extracted coding mode to construct the output video bit-stream.

40. The system of claim 37 wherein the means for translating is configured to translate the extracted quantization value based on quantization factors of the user-definable quantization matrix.

* * * * *